United States Patent [19]

Hoffmann et al.

[11] Patent Number: 4,681,205
[45] Date of Patent: Jul. 21, 1987

[54] DISPLACEABLE INCLINED HOIST

[75] Inventors: Dieter Hoffmann, Lübeck; Reinhard Trümper, Ratekau, both of Fed. Rep. of Germany

[73] Assignee: O & K Orenstein & Koppel AG, Fed. Rep. of Germany

[21] Appl. No.: 767,134

[22] Filed: Aug. 19, 1985

[30] Foreign Application Priority Data

Aug. 21, 1984 [DE] Fed. Rep. of Germany ....... 3430642

[51] Int. Cl.⁴ .................. B65G 41/00; E02F 7/02; E21C 47/04
[52] U.S. Cl. .............................. 198/307.1; 180/9.5; 198/314; 414/502; 414/595
[58] Field of Search .................. 414/595–598, 414/502; 198/307.1, 311, 314, 304; 180/9.32, 9.46, 9.5; 280/6 H, 6.11

[56] References Cited

U.S. PATENT DOCUMENTS

| | | | |
|---|---|---|---|
| 500,936 | 7/1893 | Northway et al. | 414/595 |
| 884,492 | 4/1908 | Johnson | 198/314 X |
| 937,764 | 10/1909 | Bunnell | 414/597 |
| 991,217 | 5/1911 | Lewis | 414/598 X |
| 2,121,189 | 6/1938 | Dorward | 180/9.5 X |
| 2,253,265 | 8/1941 | Cornett | 414/597 |
| 3,289,779 | 12/1966 | Feucht | 180/9.5 |
| 3,774,615 | 7/1973 | Plaquet et al. | 198/311 X |
| 4,152,004 | 5/1979 | Schröder | 280/6 H X |
| 4,234,073 | 11/1980 | Satterwhite | 198/304 |
| 4,345,680 | 8/1982 | Kay | 198/311 X |

FOREIGN PATENT DOCUMENTS 1405561 10/1968 Fed. Rep. of Germany ...... 414/595
3303059 3/1985 Fed. Rep. of Germany ...... 414/595

Primary Examiner—Joseph E. Valenza
Assistant Examiner—David A. Bucci
Attorney, Agent, or Firm—McGlew and Tuttle

[57] ABSTRACT

A displaceable inclined hoist has conveyor cars which can be moved up and down along two tracks by cable lines driven by windlasses, where the tracks together with the windlasses are located on a support construction, which is mounted in the region of its upper end around a horizontal axle on a displaceable support structure. The support construction can be pivoted in the perpendicular plane with the aid of a drive where the pair of tracks, which have different track gauges, lie one above the other in their middle region and lie in one plane in their end regions. The pairs of tracks lying one above the other, together with the support construction, have a separation distance from each other which provides clearance for the passage of the conveyor cars.

18 Claims, 7 Drawing Figures

DISPLACEABLE INCLINED HOIST

FIELD AND BACKGROUND OF THE INVENTION

The invention relates to inclined hoists for lifting bulk materials and the like.

German Pat. No. 826,424 describes a double inclined hoist, which consists of a framework construction with tracks, which on one side supports an ascending incline and on which two hopper cars can be moved to and fro by means of a cable drum. The propulsion of each car is accomplished by means of an endless cable which is firmly attached to the car. The two propelling cables are wound around a cable drum which is located in the framework, in opposite directions to each other, and the drum is driven by a driving device such as an electric motor, so that the two cars are moved in opposite directions of travel. Further, the hopper can be mounted on bearings in the upper middle part of the car, transversely to the direction of travel, so that the hopper maintains its equilibrium position even during the ascent along the inclined hoist without being specially attached.

German Pat. No. 826,424 further teaches that a cable coupling should be provided, which connects the upper edge of the hopper on the discharge side with the endless propelling cable and which permits the hopper to be uncoupled.

Nothing is said about the construction of the frameworktrack arrangement.

German Pat. No. 836,627 describes a further mode of construction of the inclined hoist in accordance with German Pat. No. 826,424, wherein the axle of the hopper, which is attached to the hopper car, is extended on each side and provided with two guide washers. Between the guide washers, the axle is provided with slide bearings. Large wheels are mounted on the axle of the hopper car at both sides. The loaded hopper cars are pulled onto the projection, which is lower than the inclined hoist, by any means of traction. On a platform, the axle of the hopper is automatically pushed onto the slideway which leads to the inclined hoist, and slides backward until it reaches a check lever, while the hopper car rolls backwardly on the rail until it reaches a bumper. There it is guided, by impact with the bumper, onto a packing track and finally held at a strike. The loaded hopper is picked up by the backward-traveling empty hopper car, which releases the check lever by means of a mechanical or electrical strike, and also causes a change in the direction of rotation of the drive motor. The hopper car is moved on the inclined hoist until it reaches the tipping location. This occurs by means of the endless propelling cable to which the hopper car is fastened. Nothing is said about the further construction of the unit, and especially about the arrangement of the frameworktrack installation.

German OS (Provisional Patent) No. 2,943,525 describes and shows a connection conveyor for conveying installations, which has at least one bridge supported at both ends and connecting at least two stopes, and at least one swiveling chassis or the like on the upper scope.

Here the bridge is supported with its upper end on the end of a conveyor of a conveyor car which faces it. The bridge projects at both sides of the chassis. The bridge can be supported on the conveyor car around a perpendicular axis in a swiveling manner, in particular, which is movable in space. The bridge is supported at its lower end in a swiveling manner and is provided at the charging location with a size reduction machine for the material being transported. The bridge carries a steep conveyor, which consists of a conveyor belt with a covering belt. This connecting conveyor is connected to the inlet of a heavy size-reduction machine at the lower end of the bridge. This presupposes an appropriately heavy construction of the displaceable carrier structure at the lower end of the bridge.

German OS No. 1,405,561 starts with two-tower inclined hoists, such as conveyor belts in mines, mine slopes and vertical cable car installations. Their conveying containers, e.g. hopper cars and conveyor buckets, are connected to tracks, movable to and fro in opposite directions by means of a cable drive. These installations are fixed to their foundations and can be shifted from one place to another only with difficulty. They can therefore only be used in a stationary manner. In the previously known form of construction, a track is carried from the lower charging location to the upper charging location. This track is guided downwardly in an arc in the middle section, which is traversed by a bridge.

The first car always runs on this lower track, whether it is moving upwardly or downwardly. In the region of the bridge, an additional pair of tracks having a broader gauge is laid above the track which passes through. The second car is provided not only with the tread rollers for the first track but also with additional tread rollers which run on this broader-gauge track in the region of the bridge. So the second car is always held on the upper track in the region of the bridge, in order that the first car can pass beneath the upper car in the region of the bridge. The installation is fixed in its location.

German Pat. No. 306,908 describes a process and a device for conveying lignite out of open pit mines, where it is explained by way of introduction, that the oblique planes of the chain tramway or the supporting pillars and turning locations of cable installations would interfere. This German patent shows a process and a device in which the conveyor cars can be relocated by means of a displaceable framework and with the help of one or more movable bridges connected to it, which extend to the edge of the open pit mine.

The displaceable framework can be installed between two excavator roads, and can be pushed forwardly, in known manner, as with the treads of the excavator, as the coal is depleted. German Pat. No. 309,485 further describes an additional embodiment of the described process and the above-described device, in which a single-track displaceable framework with a bridge extending to the edge of the open pit mine is arranged at both ends of the work site, which can comprise either a single excavator road or two or more adjoining excavator roads. The track for the conveyor cars is carried in a continuous uniform route over the two frameworks and along the entire excavator road.

These devices also have the disadvantage that one part, namely the framework for the conveyor cars, is displaceable, while the other parts of the installation are fixed in place.

German OS No. 3,303,059 describes a connecting conveyor for conveying devices which work on stopes of different heights. It consists of a supporting structure which carries a conveying arrangement. The conveying arrangement consists of an adjustable supporting construction which is fastened to the supporting structure in a pivoting manner, at least at its upper end. The supporting construction carries the conveying arrangement. The latter consists of tracks arranged on the supporting construction, on which conveyor buckets move. The conveyor buckets can be suspended on towing cables, whose hoisting windlasses are mounted on the upper end of the supporting construction. The hoisting windlasses, placed close to each other in a coaxial manner, can be coupled to each other. Furthermore, where there are two conveyor buckets traveling alongside each other, these can be connected by a towing cable which is attached and can be driven at the upper end of the supporting construction. The supporting construction can be attached flexibly, in its upper region, around a horizontal bearing, to a supporting structure which can be moved about on caterpillar treads, and can be held by a hoisting cable gripping at its upper end. This hoisting cable leads to windlasses which are located in the portion of the supporting structure which is constructed as a counterweight arm. The front part of the supporting structure (support arm) can be linked to the remaining portion of the supporting structure in a pivoted manner around a horizontal axis. A displacing device such as a windlass, hydraulics or the like is located between the two structural components. The supporting structure can be pivoted about a horizontal axle located in the direction of travel of the chassis in the region of the caterpillar treads on the incline side. Here displacing means such as hydraulics are located between the supporting structure and the caterpillar tread.

The lower end of the supporting construction can be extended telescopically. The supporting construction can be displaced and adjusted in its longitudinal direction in the region of its horizontal mounting. For mounting the connecting conveyor, a rotating shaft pivotable about the horizontal axle of the mounting can be used, where the supporting construction is mounted in this pivotable shaft in a rolling or sliding manner. The supporting construction can be provided, in the region of the mounting on the supporting structure, with a pillar, at whose upper and tension cables are attached, which lead to both ends of the supporting construction.

The support construction can consist of a box girder, to which the side parts carrying the tracks are fastened, these side parts being connected to the upper end of the pillar by means of guying cables. The support construction can be provided at its lower end with an extensible supporting foot.

The support construction can be mounted at its lower end on a caterpillar chassis. The conveyor buckets can be provided with a pivotable bottom flap which has support rollers which, while running along the tracks mounted in the support construction, keep the bottom flaps closed.

The support rollers of the bottom flaps can run along on the tracks of the conveyor buckets. Instead of one support roller, several of them can be arranged one behind the other against the bottom flap. In the discharge zone at the upper end of the support construction, a part of the tracks which carry the conveyor buckets or the support rollers can be swung out, so that the bottom flaps open downwardly.

A chute can be mounted on the support construction in the region of the bottom flaps which are to be opened. The tracks can run together to form an endpiece at the lower end of the support construction, so that the conveyor buckets have about the same position when they reach their final position at the bottom. The tracks can be connected in the bottom region, by means of a track switch, to form a common endpiece.

German Pat. No. 369,152 describes a chassis provided with two caterpillar treads and loaded at one side or, with a superstructure arranged in the manner of a lateral outrigger. Here the principal caterpillar tread which carries the main load, or its carrier, has a rigid connection to the superstructure. There is a second auxiliary catepillar tread drive, which is coupled to the chassis so as to be pivotable around an axis lying in a direction transverse to the caterpillar tread.

SUMMARY OF THE INVENTION

The present invention starts with the inclined hoist in accordance with German OS No. 3,303,059 and is intended to provide such a hoist which is suitable, particularly in open pit mining, for conveying coarse chunks of material and is as light as possible in its manner of construction. In this way, not only the inclined hoist, but also its support structure, can be of light construction. The inclined hoist is also intended to be usable on uneven ground without particular difficulties, it being intended to have the shape of the pillar of the chassis such that, during both travel and operation, the center of gravity will remain, with sufficient certainty, within the profile of the pillar.

Accordingly an object of the present invention is to provide an inclined hoist which has two conveyor cars that run on two tracks and which can be moved up and down by cable lines operated on winches or windlasses, where the tracks are located along with the windlasses on one support construction which is mounted in the region of its upper end around a horizontal axis on a displaceable support structure and which can be pivoted in a vertical plane with the aid of a drive mechanism, the tracks having different track gages and being located one above the other in a middle region of the support structure and in the same at end regions of the track, the clearance between the tracks in the middle region being sufficient to permit passage of the conveyor cars.

Another object of the invention is to provide a displaceable inclined hoist which is simple in design, rugged in construction and economical to manufacture.

The various features of novelty which characterize the invention are pointed out with particularity in the claims annexed to and forming a part of the disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

The drawings show embodiments of the device in accordance with the invention, in schematic form, wherein.

DESCRIPTION OF THE PREFERRED EMBODIMENTS

Figure 1:
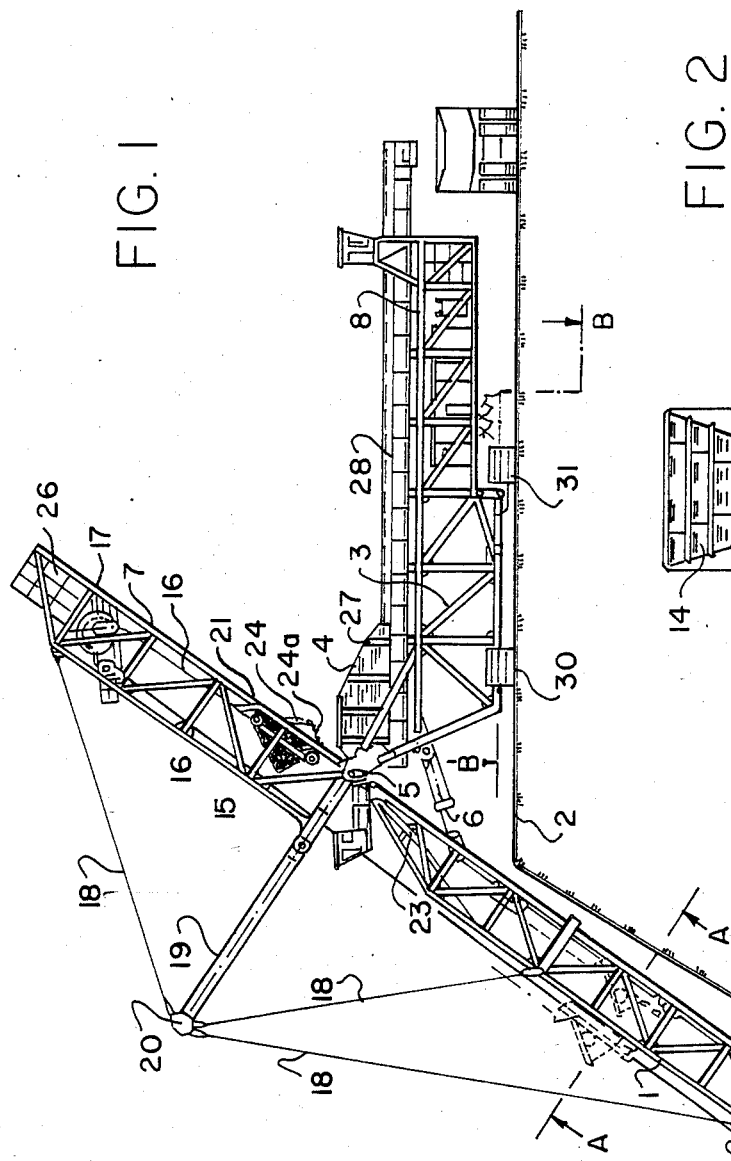
FIG. 1 is a side view of an inclined hoist in an embodiment suitable for the loading of heavy trucks.

As shown in FIG. 1, the inventive inclined hoist consists of a support construction 1, which is carried by a support structure 3 which can be displaced along the upper stope 2. The support structure 3 is provided with a mounting arm 4 to which a horizontal bearing 5 for support construction 1 is fastened.

To pivot support construction 1 in a vertical plane, a hydraulic drive 6 is provided, which is attached to mounting arm 4 or to the support structure 3 on the one hand, and to support construction 1 on the other hand. A cable line can also be used for the pivoting operation. This is attached to a rear end 7 of the support construction 1 and leads to a counterweight arm 8 of the support structure 3.

Support construction 1 carries two pairs of tracks 12 and 13 having different track gauges and arranged one above the other in the middle portion of the support construction 1, while they both lie in one plane in the upper and lower end regions. Tracks 12 have a wider gauge than tracks 13.

The distance between the pairs of tracks 12 and 13 in the middle region in such that there is clearance for a conveyor car 15 which runs along the lower track pair. Another conveyor car 14 runs on the other track pair. The two conveyor cars 14 and 15 are suspended on a double cable line 16, which runs along on both sides of the tracks and is carried around a double cable drum 17. The drum 17 is driven by a drive motor (not shown) and forms windlass means for the cables.

The support construction 1 is connected to the upper end of an arm 19 via guying cables 18. This arm or beam is flexibly attached, in the region of its bearing 5, to support construction 1 or to its carrier, which is of framework construction.

Guying cables 18 can each consist of a pair of cables which are attached laterally to support construction 1 and which run together at the top to a guywire head 20 at the top of arm 19.

The pair of tracks 13 lies in the lower part of support construction 1, which serves to load the material being conveyed, at a lower plane 21, and passes in front of the region of the dumping location in an upper plane 22. The pair of tracks 12, on the other hand, is in the lower part of the support construction 1, in the upper plane 22, and in the upper part it runs in the lower plane 21 at approximately position 23 in FIG. 1. At both the loading location and the dumping location, the pairs of tracks are in one plane 21, 22 alongside each other.

Conveyor cars 14 and 15 are located in the same position during loading and discharge. This is advantageous for the filling and the emptying of the conveyor cars.

Figure 2:
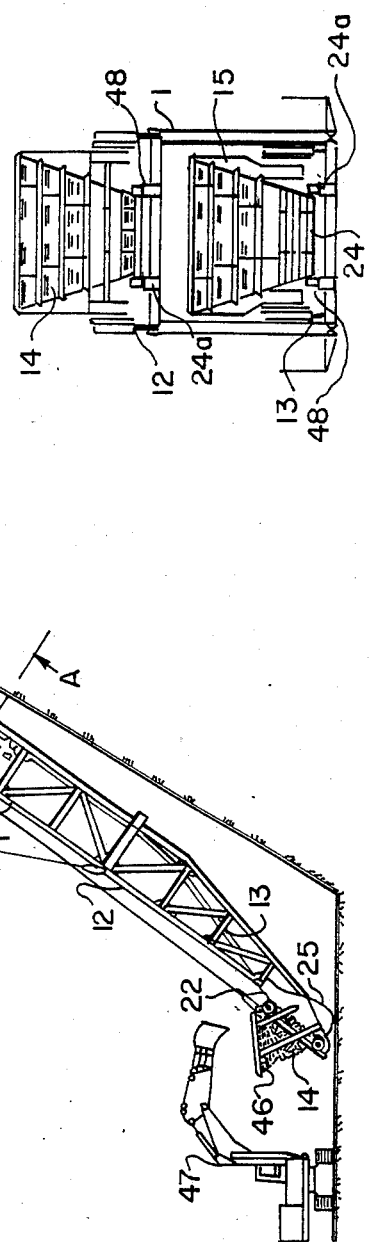
FIG. 2 is a section taken along line A—A of FIG. 1.

Conveyor cars 14 and 15 are equipped with bottom flaps 24 which swing downwardly and, in the example of the embodiment, can be driven indirectly. Bottom flaps 24 are provided with support rollers 48 (FIG. 2)., which can be supported against an additional track 24a (FIG. 1), which is provided in the region ahead of the emptying station and which is bent downwardly in the emptying zone, so that there the bottom flap 24 can swing down. Beyond this, the bottom flap 24 is held in the closed position by means of locking bolts (not shown) which are opened ahead of the discharge position. The locking bolts can be controlled automatically.

Support construction 1 can be provided at its lower end with a supporting foot 25, so that support construction 1 is supported at this location during loading. At the opposite end, support construction 1 can be provided with a counterweight 26.

A chute 27 is arranged beneath the dumping position. Chute 27 is essentially a vessel from which the material being conveyed is removed with the aid of a conveyor 28 and either loaded directly onto heavy trucks (FIG. 1) or, for example, conveyed to a crusher 11 in accordance with the embodiment of FIG. 3. This serves at the same time as a counterweight for the support construction 1 in FIG. 3.

The support structure 3 as shown in FIG. 1, is mounted on both sides on two caterpillar treads 30 and 31 lying in the direction of the stope 2. The number of caterpillar treads and the construction of the chassis depends on the particular circumstances.

Figure 3:
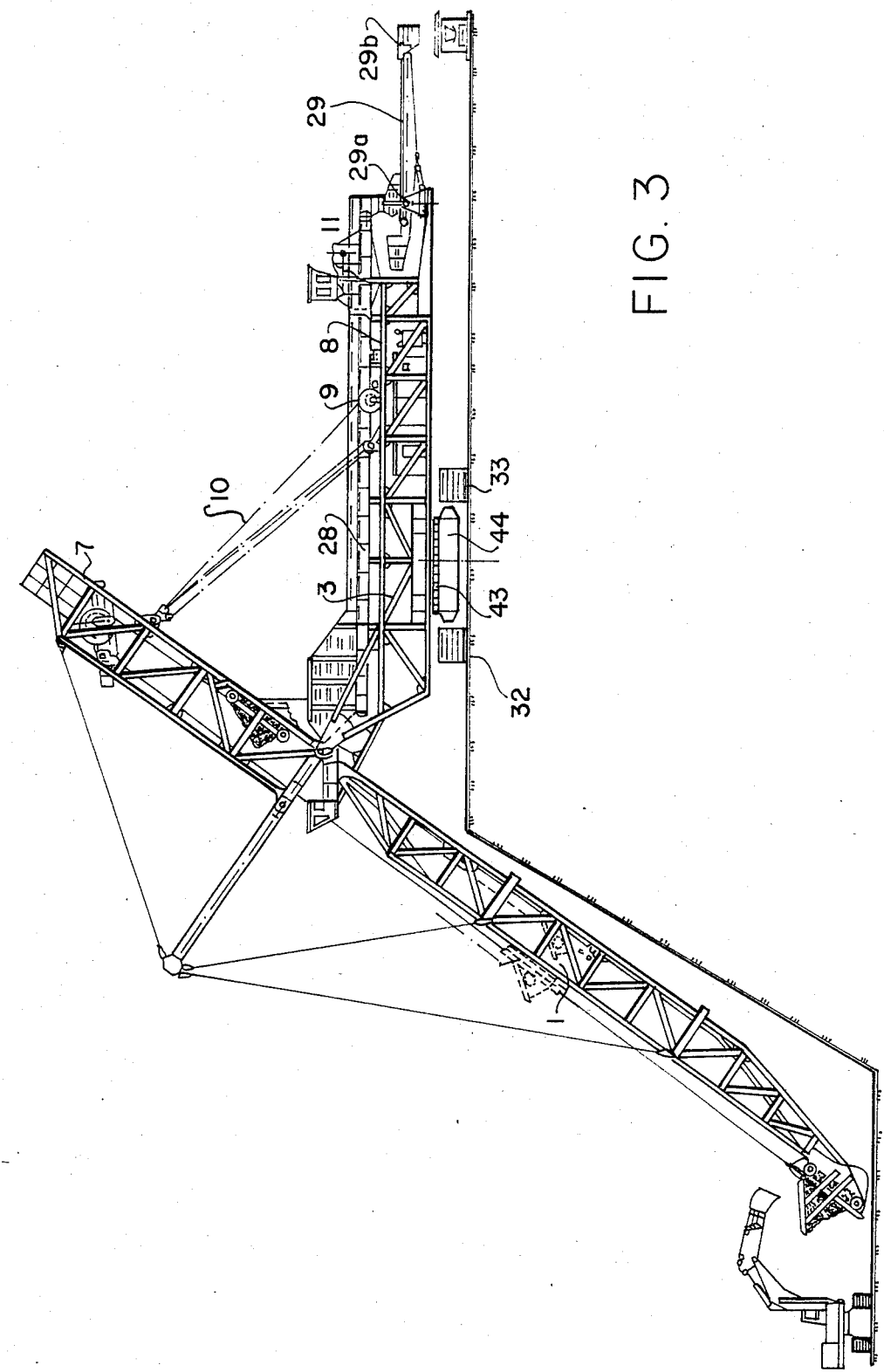
FIG. 3 is a view similar to FIG. 1 of a modified embodiment, in which the support structure is equipped with a crusher as a counterweight and is pivotable in a horizontal plane.

In the embodiment represented in FIG. 3, cable winches 9 for a lifting cable 10 are located in the rear portion of the counterweight arm 8. A discharge belt 29 has a loading end which is located below the crusher unit 11. The belt 29 is constructed to be pivotable about axis 29a in a horizontal plane and telescopically extensible (not shown), and has a discharge end 29b which can be shifted vertically due to the pivoting action at axis 29a.

In addition, the embodiment of FIG. 3 differs from that in FIG. 1 in that the support structure 3 is mounted on the undercarriage 44 by means of a rotating linkage 43. This undercarriage in turn is mounted on caterpillar treads 32 and 33 as depicted.

Figure 4:
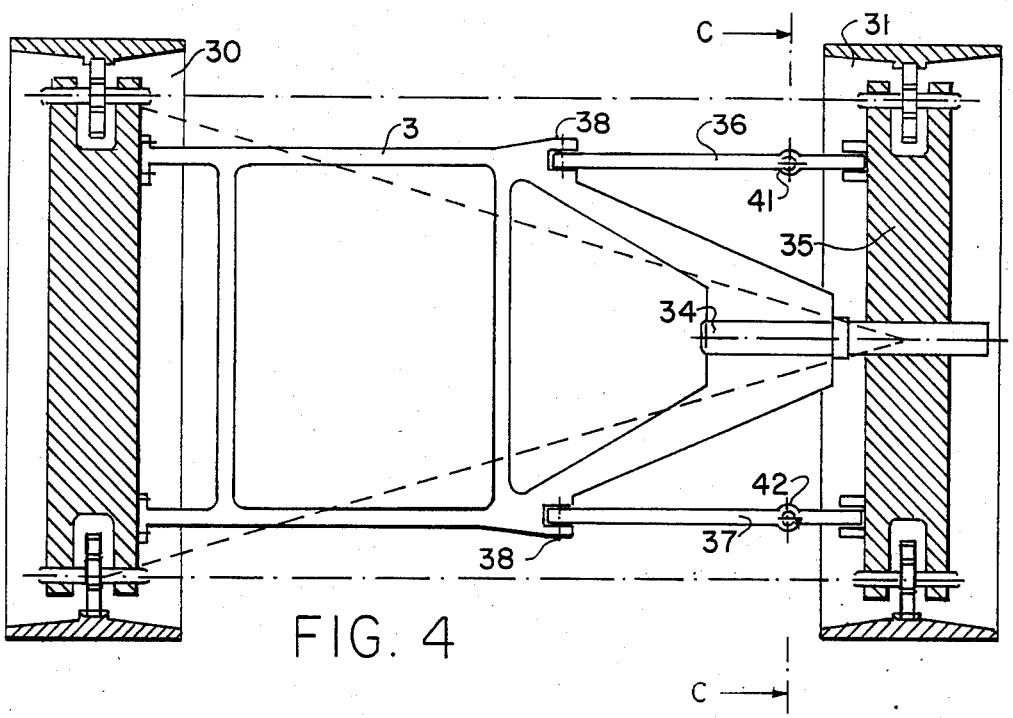
FIG. 4 is a section taken through the chassis of the support structure on line B—B of FIG. 1.
Figure 5:
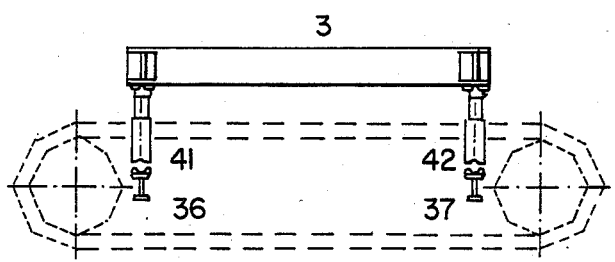
FIG. 5 is a view of the caterpillar mounting taken along line C—C of FIG. 4.
Figure 6:
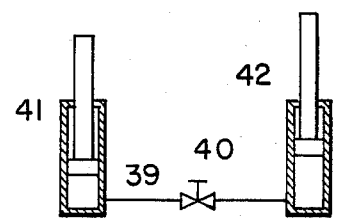
FIG. 6 is a schematic diagram of the hydraulic mounting with two hydraulic cylinders for the invention.

FIG. 4 shows a mounting for the support structure 3 on two caterpillar treads 30 and 31, with which the shape of the mounting can be changed. One caterpillar tread 30 is arranged on the support structure 3 in a fixed manner, and the other tread 31 is mounted on support structure 3 so as to be pivotable around a horizontal axle 34 in a vertical plane.

The caterpillar tread support 35 is attached at both sides of axle 34 to two guide rods 36 and 37, which are connected at 38 to the support structure 3. In this way the caterpillar tread support 35 is kept parallel to the support of the other caterpillar tread 30.

Between the caterpillar tread carrier 35 or at the guide rods 36, 37 which are flexibly linked to a caterpillar tread carrier 35, on the one hand, and a part of the support structure 3 which is not represented in detail on the other hand, there are attached the two components of the hydraulic cylinder 41 and 42. The piston chambers of these are joined with each other by means of a connecting pipe or tube 39. A shut-off valve 40 is inserted in the tube 39. During travel, this shut-off valve 40 is opened, so that the caterpillar tread carrier 35 can pivot in a vertical plane around axle 34. The support shape becomes a triangle as shown by the dashed line in FIG. 4 (due to the free pivoting of tread 31 on carrier 35). If it is desired to enlarge the shape, the shut-off valve 40 is closed. The support is now considerably larger, becoming a rectangle as shown by the dot-anddash line, and is bounded on both sides by the caterpillar treads 30 and 31.

Figure 7:
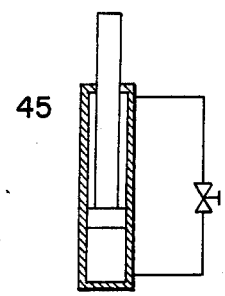
FIG. 7 is a schematic diagram of the hydraulic mounting with only one hydraulic cylinder in accordance with FIG. 6.

Instead of the two hydraulic cylinders 40, 41, it is also possible to have only one double-acting hydraulic cylinder 45 on one side of the caterpillar tread frame. Here the piston chambers are connected via a hydraulic piping which can be blocked off. This embodiment is represented schematically in FIG. 7.

At the lower end of the support construction 1 there is a loading chute 46 (FIG. 1), into which, for example, the material to be conveyed can be fed by an excavating shovel 47. The chute ends directly above one of the conveyor cars 14, 15, when these are located in the lower position. The loading chute 46 can also be constructed as a bunker which is closed off at the bottom by a controllable shut-off flap (not shown).

Accordingly the invention is a displaceable inclined hoist which comprises a displaceable support 3, an inclined support 1 pivotally mounted to said displaceable support 3 for rotation about a horizontal axis 5 in a vertical plane, drive means 6 connected between the displaceable inclined support for pivoting said inclined support on said displaceable support, two pairs of tracks 12,13 connected to said inclined support 1 and extending therealong, said two pairs of tracks having different gauges and each having a middle portion and opposite end portions, said two pairs of tracks lying in a common plane at each of their opposite ends and being disposed one above the other in said middle portions, conveyor cars 14,15 mounted for riding on each of said two pairs of tracks 12,13, said two pairs of tracks being spaced apart in said middle portions thereof by an amount sufficient to permit clearance for one of said conveyor cars riding on a lower one of said two pairs of tracks 13 and windlass means 17 connected to said conveyor cars and carried by said inclined support 1 for moving said conveyor cars upwardly and downwardly on said two pairs of tracks respectively.

While specific embodiments of the invention have been shown and described in detail to illustrate the application of the principles of the invention, it will be understood that the invention may be embodied otherwise without departing from such principles.

What is claimed is:

1. A displaceable inclined hoist comprising:
a displaceable support;
an inclined support pivotally mounted to said displaceable support for rotation about a horizontal axis and in a vertical plane;
drive means connected between said displaceable and inclined support for pivoting said inclined support on said displaceable support;
two pairs of tracks connected to said inclined support and extending therealong, said two pairs of tracks having different gauges and each having a middle portion and opposite end portions, said two pairs of tracks lying in a common plane at each of their opposite ends and being disposed one above the other in said middle portions, the upper one of said pair of tracks having a wider gauge than the lower one of said two pairs of tracks;
a conveyor car mounted for riding on each of said two pairs of tracks, said two pairs of tracks being spaced apart in said middle portions thereof by an amount sufficient to permit clearance for one of said conveyor cars riding on a lower one of said two pairs of tracks; and
windlass means connected to said conveyor cars and carried by said inclined support for moving said conveyor cars upwardly and downwardly on said two pairs of tracks respectively.

2. A hoist according to claim 1, wherein said windlass means comprises a windlass drum rotatably mounted to said inclined support at a top end thereof, and a cable wound on said drum for each conveyor car, connected to each conveyor car respectively.

3. A hoist according to claim 1, wherein said displaceable support includes a counterweight arm spaced from a point of pivotal connection between said displaceable support and said inclined support, a cable windlass mounted on said counterweight arm and a cable connected between said cable windlass and said inclined support at a location on said inclined support above said pivotal connection.

4. A hoist according to claim 1, including at least one guide rod hinged between said second caterpillar tread carrier and said displaceable support on each side of said second horizontal mounting between said displaceable support and said caterpillar tread carrier for maintaining a parallel path of movement for said first and second caterpillar treads.

5. A hoist according to claim 4, including a hydraulic cylinder and piston combination connection between said guide rod and said displaceable support on each side of said horizontal mounting between said second displaceable support and said tread carrier, each cylinder and piston combination having a piston chamber, a hydraulic pipe connected between said piston chambers and a shutoff valve in said hydraulic pipe for closing and opening flow between said piston chambers.

6. A hoist according to claim 4, including a single double-action hydraulic cylinder connected between said guide rod and said displaceable support at a location spaced from said mounting between said second displaceable support and said tread carrier, said hydraulic cylinder having a piston therein and defining two piston spaces, a hydraulic pipe connected between said piston spaces and a shutoff valve in said hydraulic pipe.

7. A hoist according to claim 1, wherein said displacement support has an end, said inclined support being pivotally mounted to said end of said displaceable support, said drive means comprising a hydraulic piston and cylinder combination connected between said displaceable and inclined supports.

8. A hoist according to claim 1, including a caterpillar chassis connected to said displaceable support for carrying and permitting rotation of said displaceable support about a vertical axis, and caterpillar treads connected to said chassis for moving said displaceable support.

9. A hoist according to claim 1, wherein each of said conveyor cars includes a bottom flap which is movable between an opened and closed position, a chute mounted on said inclined support and having activating means engageable with said bottom flap of each conveyor car when each conveyor car is moved into the vicinity of said chute for opening said bottom flap to discharge material from said conveyor car, said chute being located adjacent the upper end portions of said two pairs of tracks.

10. A hoist according to claim 9, including a loading conveyor connected to and extending along said displaceable support, said loading conveyor having a loading end disposed under said chute and a discharge end disposed at an end of said displaceable support opposite from said inclined support.

11. A hoist according to claim 10, including a crusher unit connected to said displaceable support located at said opposite end of said displaceable support for receiving material from said discharge end of said conveyor.

12. A hoist according to claim 10, including a discharge belt pivotally mounted to said opposite end of said displaceable support for receiving material from said crusher, said discharge belt being mounted so that an end thereof opposite from said displaceable support is movable vertically.

13. A hoist according to claim 1, wherein said inclined support has opposite ends and is pivotally mounted to said displaceable support at an intermediate location between said opposite ends.

14. A hoist according to claim 1, including an upwardly projecting arm connected to said inclined support and extending upwardly from a location of the pivotal connection between said inclined and displaceable support, said arm having an upper end, and a plurality of guying cables connected between said upper end of said arm and said inclined support at locations on opposite sides of said arm.

15. A hoist according to claim 1, wherein said inclined support is formed of a closed framework construction.

16. A hoist according to claim 1, wherein said inclined support has a lower end, with a support foot connected to said lower end of said inclined support.

17. A hoist according to claim 1, wherein each conveyor car includes a bottom flap, a roller operatively connected to each bottom flap for engagement with a guide track for opening and closing each bottom flap, and a guide track connected to said inclined support at a location for unloading each conveyor car which is adjacent upper ones of said opposite ends of said tracks, for opening said flaps thereat.

18. A hoist according to claim 1, including caterpillar tread means connected to said displaceable support for moving said displaceable support, said caterpillar tread means including a first caterpillar tread carrier mounted in a rigid manner to said displaceable support, and a second caterpillar tread carrier pivotally mounted about a horizontal axis to said displaceable support, a first caterpillar tread mounted on said first caterpillar tread carrier and a second caterpillar tread mounted on said second caterpillar tread carrier, thereby permitting relative pivoting between said first and second caterpillar treads.

* * * * *